United States Patent [19]

Kakuhata et al.

[11] Patent Number: 4,568,012
[45] Date of Patent: Feb. 4, 1986

[54] SOLDERING APPARATUS

[75] Inventors: Fumio Kakuhata, Tokyo; Junzo Taguchi, Yokohama, both of Japan

[73] Assignee: Toshiba Seiki Co., Ltd., Ebina, Japan

[21] Appl. No.: 452,808

[22] Filed: Dec. 23, 1982

[30] Foreign Application Priority Data

Jan. 14, 1982 [JP] Japan .................. 57-4686
Jan. 14, 1982 [JP] Japan .................. 57-4687
Jan. 14, 1982 [JP] Japan .................. 57-4688
Jun. 8, 1982 [JP] Japan .................. 57-98013

[51] Int. Cl.⁴ ............................. H05K 3/34
[52] U.S. Cl. .................. 228/37; 228/180.1; 228/260; 118/429
[58] Field of Search .......... 228/180 R, 37, 260, 228/56 A; 164/500, 147.1; 118/429; 417/50; 164/490

[56] References Cited

U.S. PATENT DOCUMENTS

| | | | |
|---|---|---|---|
| 2,985,106 | 5/1961 | Rhudy | 310/11 |
| 3,263,283 | 8/1966 | Allard | 164/490 |
| 3,797,724 | 3/1974 | Flury et al. | 228/37 |
| 3,941,088 | 3/1976 | Ronaföldi | 118/429 |
| 3,942,577 | 3/1976 | Vozumi | 164/500 |
| 4,072,777 | 2/1978 | Schoenthaler | 228/37 |

FOREIGN PATENT DOCUMENTS

| | | | |
|---|---|---|---|
| 51-42590 | 11/1976 | Japan . | |
| 52-60408 | 5/1977 | Japan | 417/50 |
| 54-14338 | 2/1979 | Japan | 164/500 |
| 421447 | 9/1974 | U.S.S.R. | 228/37 |
| 617196 | 7/1978 | U.S.S.R. . | |
| 627934 | 10/1978 | U.S.S.R. . | |
| 656759 | 4/1979 | U.S.S.R. . | |
| 707709 | 1/1980 | U.S.S.R. | 228/37 |

Primary Examiner—Nicholas P. Godici
Assistant Examiner—C. McKee
Attorney, Agent, or Firm—Oblon, Fisher, Spivak, McClelland & Maier

[57] ABSTRACT

A soldering apparatus has a base, and a solder tank and a nozzle arranged in tandem with the base. A partition plate is arranged in the solder tank. The partition plate, a bottom plate disposed at the bottom of the solder tank, and a lower plate covering the bottom of the solder tank define a channel communicating with a portion of the solder tank remote form the nozzle and the interior of the nozzle. A moving magnetic field generating mechanism for exerting a force toward the nozzle to a solder in the channel is arranged in the base to extend along the channel under the partition wall. That portion of the solder tank at the side of the nozzle constitutes a wide portion of the same width as that of the nozzle while the remaining portion of the solder tank constitutes a narrow portion.

10 Claims, 9 Drawing Figures

SOLDERING APPARATUS

BACKGROUND OF THE INVENTION

The present invention relates to a soldering apparatus for spraying a molten solder such as soft solder from a nozzle onto the rear surface of a printed circuit board.

A soldering apparatus shown in U.S. Pat. No. 3,797,724 has been proposed which solders leads of electric elements mounted on a printed circuit board to a circuit pattern formed on the rear surface of the board.

As shown in FIG. 1, this apparatus has a solder tank 1 containing a molten solder 2 such as soft solder. A flow channel 6 extends from one end to the other end of the tank 1. The molten solder 2 is caused to flow in the channel 6, from one end to the other end of the tank 1 by an electromagnetic pump 3 surrounding part of the channel 6. The molten solder 2 reaches a slit nozzle 4 projecting upward from the other end of the tank 1 and is sprayed therefrom in the form of a thin film. A printed circuit board 5 to be soldered is conveyed above the nozzle 4 in the direction indicated by arrow A, and its bottom surface is uniformly sprayed with the solder. In this manner, the leads of the electric elements projecting from the rear surface of the printed circuit board 5 are soldered to the circuit pattern formed on the rear surface of the board 5.

Referring to FIG. 2, the electromagnetic pump 3 has a C shaped iron core 7 whose forked ends sandwich channel 6 so as to generate a magnetic field perpendicular thereto, and a coil 8 wound around the iron core 7. A pair of electrodes 9 are arranged perpendicularly to the channel 6 and to the magnetic field of the iron core 7. Therefore, a current flows through the molten solder within the channel 6 in a direction perpendicular to the channel 6 and to the magnetic field of the iron core 7. The directions of the magnetic field of the iron core 7 and the current flowing between the electrodes 9 are so selected that a force acts in the direction indicated by arrow B in FIG. 2 to cause the molten solder 2 to flow in the channel 6 toward the nozzle 4.

However, since the specific gravity of the molten solder such as soft solder is relatively great, the solder may not be sprayed from the nozzle 4 unless a relatively great force acts on the molten solder in the channel 6. In the conventional soldering apparatus, that portion of the channel 6 on which the magnetic field generated by the iron core 7 can act is limited. For this reason, the intensity of the magnetic field to be generated by the iron core 7 must be increased in order to obtain a greater force. This requires a bigger iron core 7 and a bigger coil 8. Since electrodes 9 are also required, the electromagnetic pump 3 becomes bulky. Furthermore, a current flows in that wall portion of the channel 6 which contacts the electrodes 9. For this reason, these wall portions corrode and must be repaired frequently.

In addition, the depth of the tank 1 is greater than the width of the printed circuit board 5 to be soldered, resulting in a larger tank 1 and a greater amount of molten solder to be stored therein. However, since only a small amount of solder is applied to the rear surface of each printed circuit board 5, most of the solder in the tank 1 remains molten therein for a long period of time, and is oxidized upon contact with the air. A greater amount of solder to be stored in the tank 1 also requires a larger heater for heating it. It also takes a longer period of time before the solder is molten and ready to be sprayed when the solder is heated from the solid phase.

The solid solder must begin melting from the interior of the tank 1 toward the channel 6. However, since the channel 6 is spaced apart from the tank 1, it takes a long period of time for the solder in the channel 6 to melt.

In a conventional soldering apparatus of the configuration described above, the coil 8 is not cooled directly. Therefore, the electromagnetic pump 3 cannot be cooled satisfactorily.

SUMMARY OF THE INVENTION

It is an object of the present invention to provide a soldering apparatus which uses a moving magnetic field generating mechanism as means for moving solder in the channel, so that the apparatus may be highly reliable and may have a long service life.

It is another object of the present invention to provide a compact soldering apparatus, in which the amount of molten solder in a tank is reduced to a minimum, so that heating energy of the solder is reduced to a minimum and deterioration in the quality of the solder is prevented.

It is still another object of the present invention to provide a soldering apparatus which is capable of melting a solid solder in a tank and in a channel communicating therewith.

It is still another object of the present invention to provide a soldering apparatus in which cooling of the moving magnetic field generating mechanism may be effectively performed.

According to the present invention, there is provided a soldering apparatus comprising a base; an elongate lower plate which is mounted on the base and which has an elongate hole extending along the lower plate; a nozzle which is arranged on one end of the lower plate to communicate with the hole and which has on a top thereof a horizontal slit-shaped orifice directed upward and toward the other end of the lower plate; a solder tank which extends on the lower plate from the nozzle to the other end of the lower plate; a bottom plate covering an underside of the hole in the lower plate; a partition plate which extends in the solder tank from the nozzle to a vicinity of one end of the solder tank at the side of the other end of the lower plate and which defines together with the bottom plate a channel communicating one portion at said one end of the solder tank with the nozzle; and a moving magnetic field generating mechanism which is arranged along the channel in the base and which generates a force to cause molten solder in the channel to flow from said one end of the solder tank to the nozzle.

BRIEF DESCRIPTION OF THE DRAWINGS

This invention can be fully understood from the following detailed description with reference to the accompanying drawings, in which.

DETAILED DESCRIPTION OF THE PREFERRED EMBODIMENTS

Figure 1:
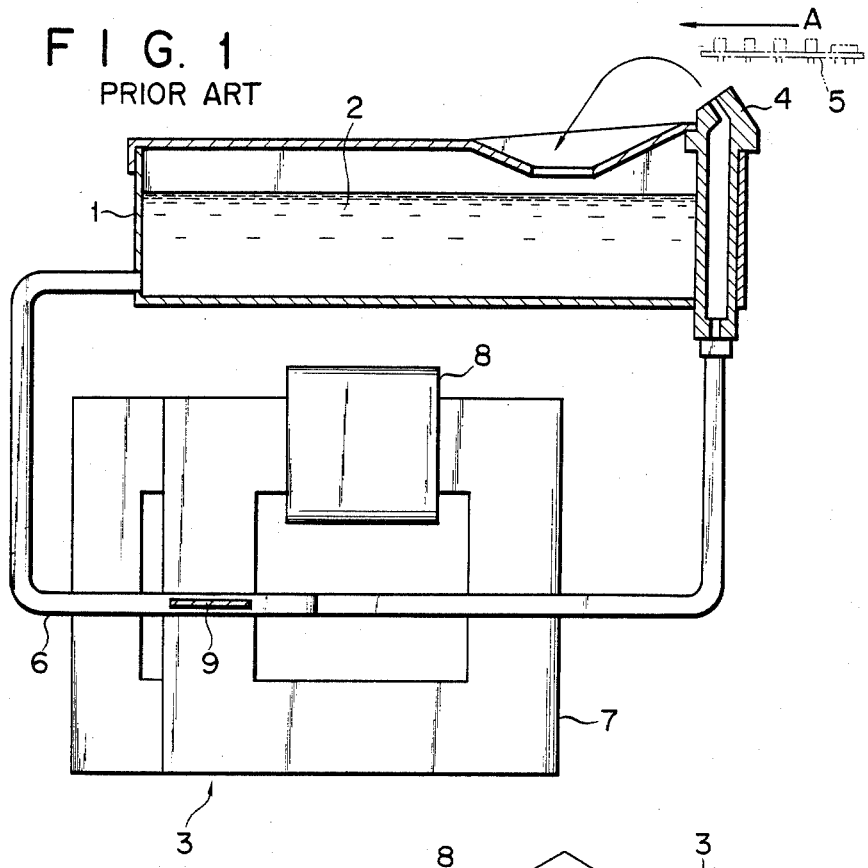
FIG. 1 is a schematic perspective view of a conventional soldering apparatus.
Figure 2:
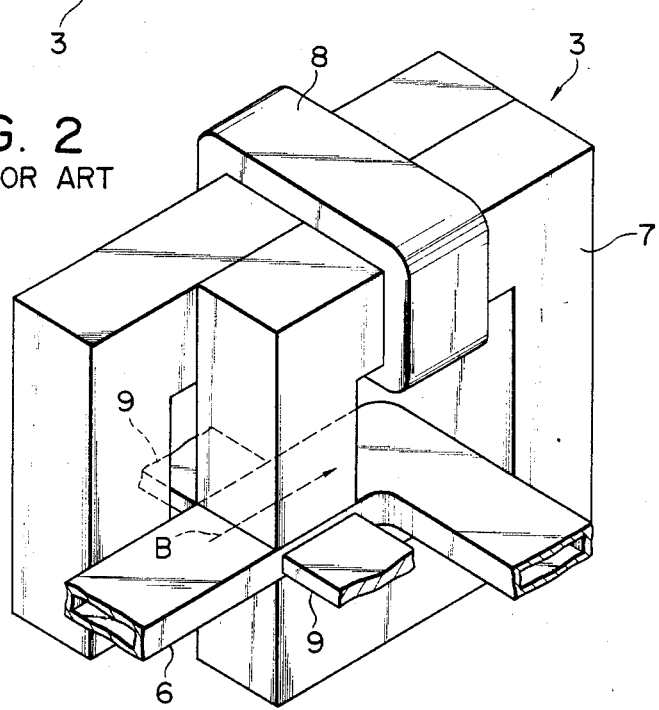
FIG. 2 is a schematic perspective view of an electromagnetic pump shown in FIG. 1.
Figure 3:
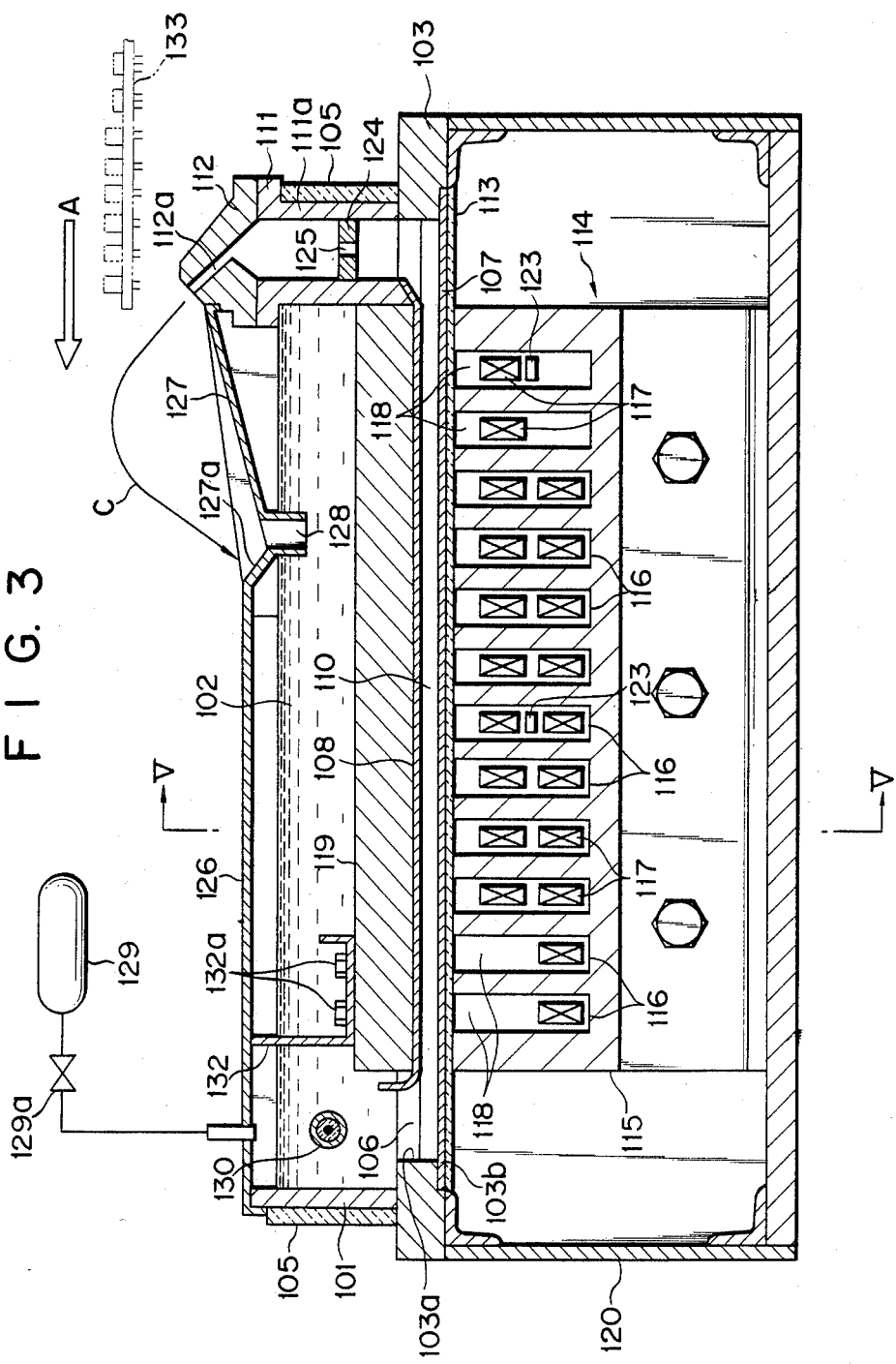
FIG. 3 is a longitudinal sectional view of a soldering apparatus according to an embodiment of the present invention.
Figure 4:
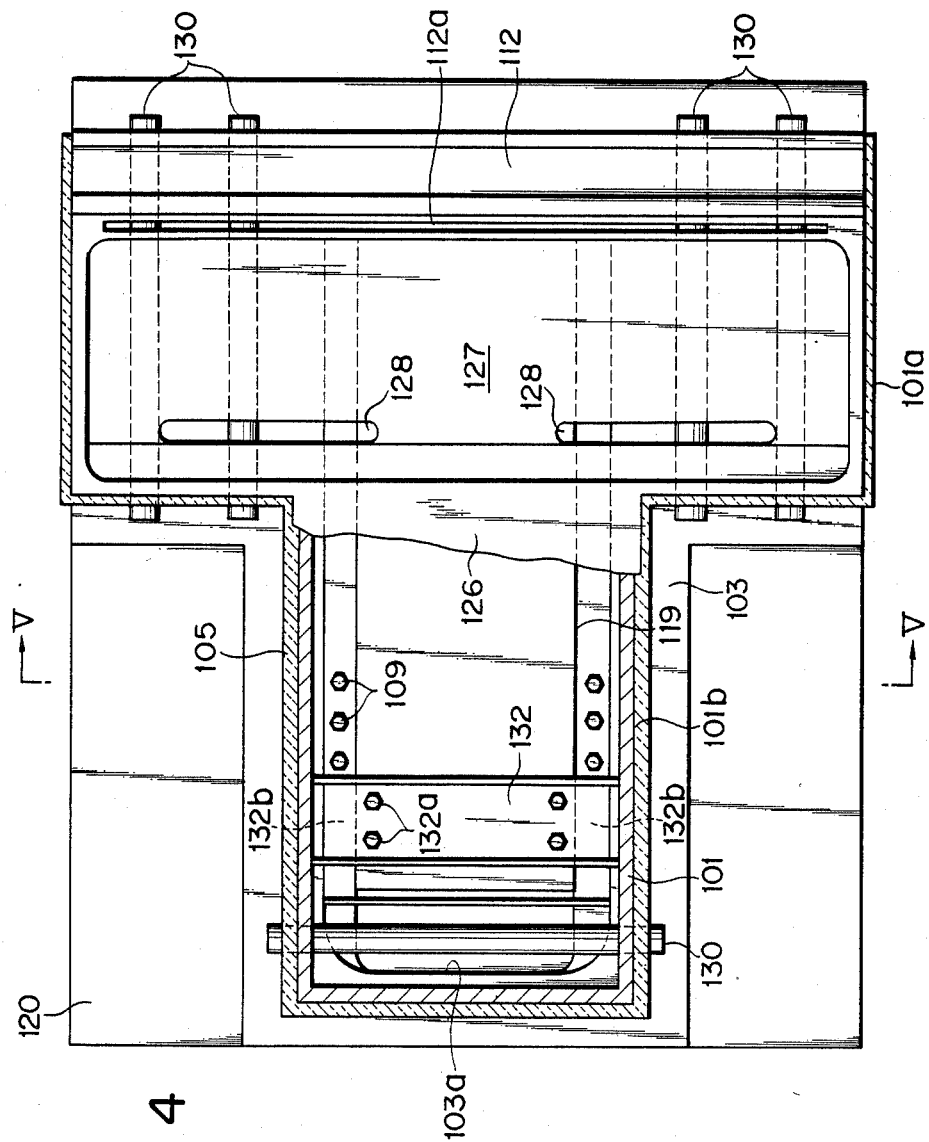
FIG. 4 is a plan view of the apparatus shown in FIG. 3, with part thereof being broken.
Figure 5:
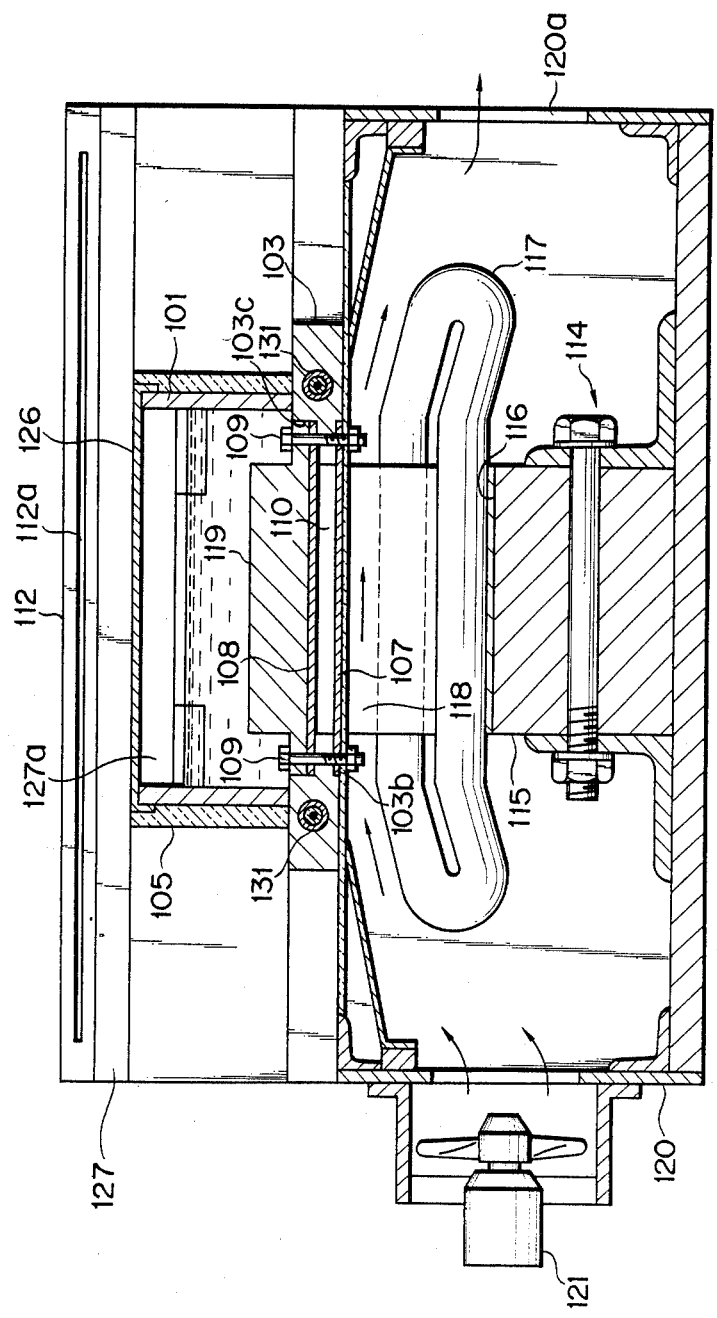
FIG. 5 is a sectional view of the apparatus shown in FIG. 3 along the line V—V, with a coil omitted.

Referring to FIGS. 3 to 5, a soldering apparatus according to an embodiment of the present invention has a box-shaped base 120 with an open top, and an elongate, thick lower plate 103 fixed to its top. A solder tank 101 for storing a molten solder 102 such as soft solder is fixed onto the lower plate 103. The tank 101 has a wide portion 101a and a narrow portion 101b connected thereto, and has a T-shape in the plan view (FIG. 4). The side surfaces of the tank 101 are covered with a heat-insulating material 105 except for the end face at the side of the wide portion 101a. An elongate hole 103a is formed in the lower plate 103 so as to extend therealong. The hole 103a is formed to extend from a position of the tank 101 slightly inside the end of the narrow portion 101b and beyond the end of the wide portion 101a of the tank 101. The hole 103a is slightly narrower than the narrow portion 101b. As shown in FIG. 5, steps 103b and 103c are formed on the upper and lower portions of the lower plate 103. The step 103b receives the outer rim of a thin bottom plate 107. The bottom plate 107 closes the lower opening of the hole 103a. A thin heat-insulating plate 113 is arranged below the bottom plate 107. The step 103c receives the edge of an upper plate 108. The upper plate 108, the bottom plate 107, and the heat-insulating plate 103 are fixed to the lower plate 103 by bolts 109 (FIGS. 4 and 5).

A vertical nozzle 111 is mounted on the lower plate 103 at the end of the wide portion 101a of the tank 101. The nozzle 111 comprises a main body 111a having an elongate hollow space therein, and a head 112 which has a slit-shaped orifice 112a which is directed upwardly and toward the end of the narrow portion 101b of the tank 101. A pressure control element or a pressure control member 124 to be described later is mounted in the main body 111a. The heat-insulating material 105 is also covered over the outer surface of the main body 111a. The heat-insulating material 105 and the heat-insulating plate 113 serve to prevent cooling of the molten solder 102 in the tank 101 and in a flow channel 110.

The flow channel 110 is defined by the inner walls of the upper plate 108, the bottom plate 107 and the lower plate 103 having the hole 103a. The channel 110 communicates with the tank 101 through a gap 106 between the end of the upper plate 108 at the side of the narrow portion 101b and the end of the lower plate 103 at the same side. In other words, the gap 106 is an inlet port of the channel 110. The end of the channel 110 at the side of the wide portion 101a communicates with the lower end of the main body 111a of the nozzle 111.

A moving magnetic field generating mechanism 114 is mounted in the base 120. The mechanism 114 has a comb shaped stator iron core 115 which is obtained by stacking a plurality of thin electric iron sheets. The width and length of the iron core 115 are substantially equal to those of the channel 110. The iron core 115 is disposed right under the channel 110 with its upper surface in contact with the heat-insulating plate 113. A plurality of coil grooves 116 are formed in the iron core 115 at equal intervals along the channel 110 to open at their top ends to the channel 110. The coil grooves 116 are perpendicular to the longitudinal direction of the channel 110 (FIGS. 3 and 6).

Figure 6:
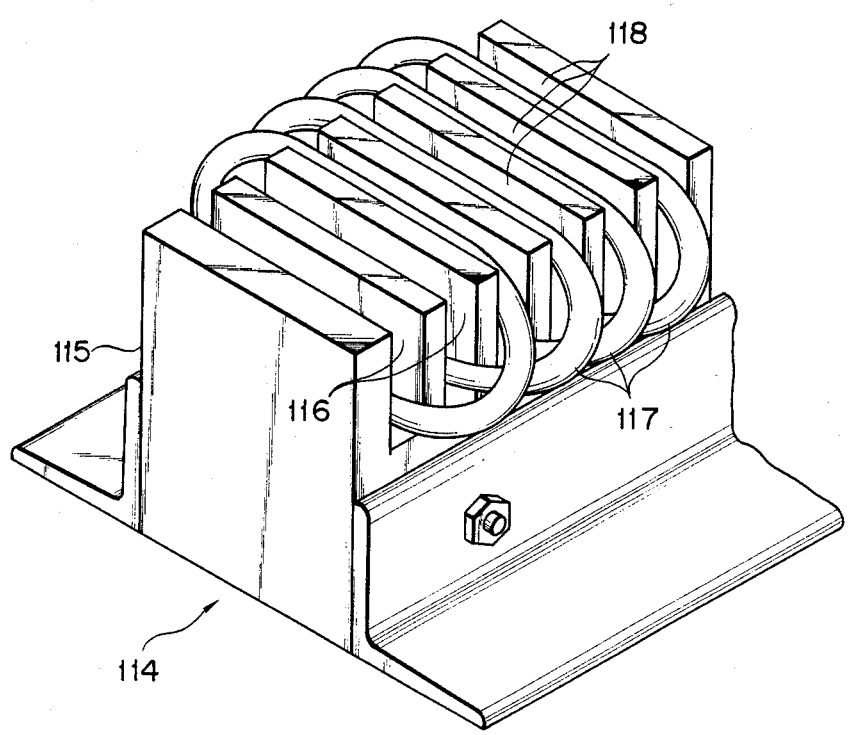
FIG. 6 is a partial perspective view of a moving magnetic field generating mechanism shown in FIG. 3.
Figure 7:
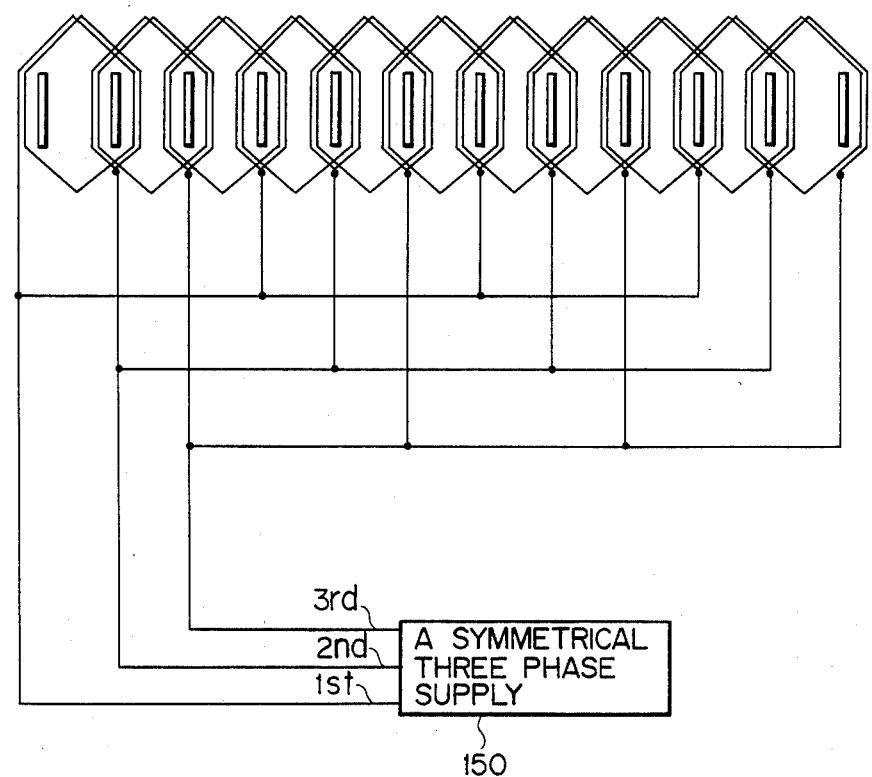
FIG. 7 shows a wiring of the moving magnetic field generating mechanism shown in FIG. 6.

As shown in FIG. 6, each stator coil 117 is disposed in two grooves: one groove 116 and a groove 116 next thereto but one. The stator coils 117 are connected to a symmetrical three phase power supply 150, as shown in FIG. 7. Referring to FIG. 7, the ends of the first coil 117 are connected to the first terminal of the most advanced phase of the power supply 150 and to the second terminal of the phase 120° lagging from that of the first terminal. The ends of the second coil 117 are connected to the second terminal and to the third terminal of the most lagged phase. The ends of the third coil 117 are connected to the third and first terminals. The remaining coils are sequentially connected in the similar manner. With this arrangement, the magnetic field moves from the side of the gap 106 to the nozzle 111 as time elapses so as to exert a force on the molten solder 102 in the same direction as that of the movement of the magnetic field. The grooves 116 have such a depth that a gap 118 is left in each of them after placing the coils 117 therein. As shown in FIG. 5, cooling fans 121 (only one is shown) are mounted on one side wall of the base 120 and supply air into the base 120 to flow through the gap 118. After the air cools the iron core 115 and the coils 117, it is exhausted to the outside the base 120 through a hole 120a formed in the opposite side wall of the base 120. In this manner, heat generated by the iron core 115 and the coils 117 and heat conducted from the molten solder 102 in the channel 110 through the bottom plate 107 and the heat-insulating plate 113 is removed, thus preventing overheating of the iron core 115 and the coils 117. Temperature sensors 123 comprising, for example, thermocouples, are arranged in the coil grooves 116 to monitor the temperature of the iron core 115 and the coils 117.

An iron core 119 of the substantially same width and length as those of the stator iron core 115 is arranged on the upper plate 108 in parallel with the stator iron core 115. By providing the iron core 119, the direction of the magnetic field generated by the iron core 115 is made substantially perpendicular to that of the channel 110 while at the same time heat generated in the iron core 119 serves to keep hot the solder in the channel 110. The iron core 119 may consist of a plurality of laminated electric iron sheets or may be a solid block. It is to be noted that the iron core 119 also serves as a partition wall for defining the channel 110.

The tank 101 is covered with a lid 126. The lid portion covering the wide portion 101a forms an inclined lid portion 127 which extends downward from the orifice 112a of the nozzle 111 toward the narrow portion 101b, and a solder receiving portion 127a which connects the lower end of the inclined portion 127 and the end of the portion of the lid 126 covering the narrow portion 101b at the side of the wide portion 101a and which is inclined downward from the narrow portion 101b toward the wide portion 101a. The lid portion covering the wide portion 101a has an overall, shallow V-shape. Solder drip ports 128 are formed at the lower end of the inclined portion 127. The solder which has dripped on the inclined portion 127 and the solder receiving portion 127a flows into the solder tank 101 through the drip ports 128. This prevents direct dripping of the solder onto the surface of the molten solder 102 in the tank 101, prevents pressure fluctuation in the tank 101 due to disturbance in the solder surface, and stabilizes the spraying operation of the solder from the nozzle 111. A gas supply device 129 such as a gas container containing a molten solder antioxidant gas such as nitrogen gas is connected to a space above the solder 102 in the tank 101 through a valve 129a. When the gas is supplied from the device 129 into the tank 101, it covers the surface of the molten solder 102 in the tank 101 to prevent oxidation of the solder 102.

Rod-shaped heaters 130 are arranged in the wide portion 101a in parallel with the channel 110 and similar rod-shaped heaters 130 are also arranged in the narrow portion 101b in perpendicular to the channel 110. A pair of heaters 131 extend in the narrow portion 101b on both sides of the channel 110 over the whole length thereof. The heaters 130 and 131 melt and/or heat the solder 102 and keep it in the heated state. A J-shaped trapping plate 132 is fixed by bolts 132a or the like onto that portion of the upper surface of the iron core 119 at the side of the narrow portion 101b. The foreign matter which may be mixed in the solder is trapped by the plate 132 when the solder passes through the openings 132b defined by the lateral stepped portions the iron core 119, the lateral inner walls of the narrow portion 101b and the lower edge of the trapping plate 132, thereby preventing such foreign matter from clogging the orifice 112a.

In operation, the heaters 130 are energized to melt the solder 102 in the tank 101 and the channel 101 and to actuate the moving magnetic field generating mechanism 114. The moving magnetic field generated by the mechanism 114 exerts a force on the molten solder 102 in the channel 110 in the direction toward the nozzle 111. The solder 102 is moved upward in the nozzle 111 and a thin film of the solder is sprayed therefrom as indicated by an arrow C from the orifice 112a of the nozzle 111. A printed circuit board 133 with electric elements mounted thereon is moved in the direction indicated by an arrow A. The solder is uniformly sprayed onto the rear surface of the board 133. The leads of the electric elements projecting from the rear surface of the board 133 is soldered to the circuit pattern formed on the rear surface of the board 133. Excess solder drops on the portion 127 and/or 127a and is returned to the tank 101 through the drip ports 128.

Figure 8:
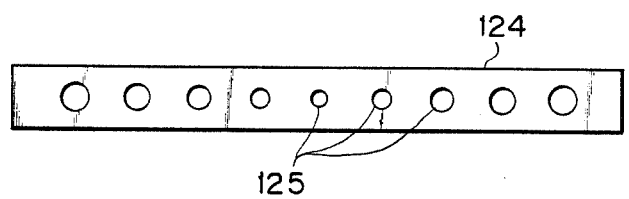
FIG. 8 is a plan view of a pressure control element in the nozzle shown in FIG. 3.

The pressure control member 124 is a plate-shaped member which has holes 125, the diameters of which become smaller toward the center thereof, as shown in FIG. 8. The molten solder 102 is forced from the channel 110 into the main body 111a. A high pressure acts on the solder 102 at that portion of the main body 111a immediately above the channel 110, whereas a low pressure acts on the solder 102 at that portion of the sides of the main body 111a which do not correspond to the channel 110. Since the holes 125 remoter from the center of the pressure control member 124 pass substantially same amount of the solder, the pressure in the space in the nozzle 111 above the pressure control member 124 is uniform, so that the molten solder 102 may be sprayed to a constant thickness over the entire length of the orifice 112a.

The dimensions of the soldering apparatus may be suitably selected in accordance with the size of the board 133 to be soldered. For example, the orifice 112a has a length of 400 mm and a width of 1 mm, and the channel 110 has a height of 4 mm, a width of 100 to 200 mm, and a length of 320 to 250 mm, with a pressure of 0.2 kg/cm$^2$ being applied on the molten solder 102.

As described above, that portion of the tank 101 which is adjacent to the nozzle 111 forms the wide portion 101a having the same width as the nozzle 111 does, thereby assuring the soldering function of the conventional soldering apparatus. The remaining portion of the tank 101 forms the narrow portion 101b so as to reduce the volume of the overall tank 101. Thus, only a limited amount of solder is contained in the tank 101, resulting in savings in the amount of solder to be consumed and electric power consumption for heating it. Furthermore, since the channel 110 is close to the tank 101, the heat of the molten solder 102 in the tank 101 is easily conducted to the solder in the channel 110 whereby the solid solder in the channel 110 can be melted within a short period of time. The moving magnetic field generating mechanism 114 extends over substantially the entire length of the channel 110. For this reason, the intensity of the magnetic fields to be generated by the individual stator coils 117 become small, and thus the coils 117 become small. This results in less electric power consumption in the coils 117 and less heat generation in the iron core 115.

In addition, this invention has the advantage that air flowing through the gap 118 of the iron core 115 effectively cools the coils 117 and the core 115.

Figure 9:
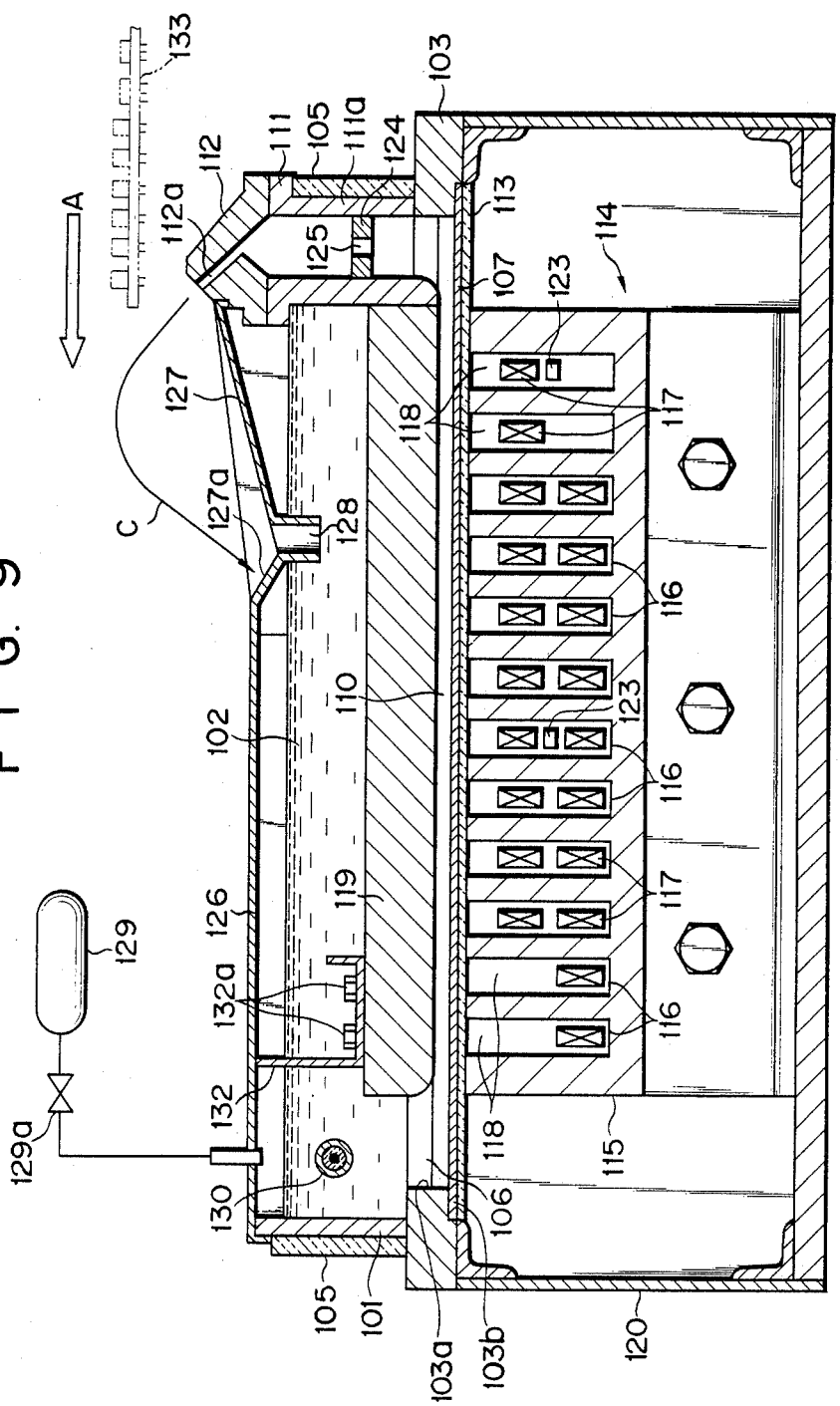
FIG. 9 is a longitudinal sectional view of a soldering apparatus according to another embodiment of the present invention.

FIG. 9 shows a soldering apparatus according to another embodiment of the present invention. The second embodiment is similar to the first embodiment except that the upper plate 108 is omitted, and the underface of an iron core 119 defines part of a channel 110. In particular, if the iron core 119 is solid, its underface can be easily flattened so as to allow for smooth flow of the molten solder.

What is claimed is:
1. A soldering apparatus comprising:
   a base;
   an elongate lower plate mounted on said base and having an elongate hole extending along the lower plate;
   a nozzle arranged on one end of said lower plate to communicate with said hole and having on a top thereof a horizontal slip-shaped orifice directed upward and toward the other end of said lower plate;
   a solder tank extending on said lower plate from said nozzle to the other end of said lower plate, said nozzle including a pressure control element extending substantially horizontally, said pressure control element having holes, diameters of said holes at a center of said pressure control element being smaller than diameters of holes remote from said center of said pressure control element;
   a bottom plate covering the underside of said hole of said lower plate;
   a partition plate extending in said solder tank from said nozzle to a vicinity of one end of said solder tank at the side of the other end of said lower plate and defining together with said bottom plate a channel communicating at said one end of said solder tank with said nozzle; and
   a moving magnetic field generating mechanism arranged along said channel in said base for generating a force to flow molten solder in said channel from said one end of said solder tank to said nozzle.

2. An apparatus according to claim 1, wherein said moving magnetic field generating mechanism comprises a stator iron core having therein coil grooves formed at equal intervals perpendicularly to the longitudinal direction of said channel, and stator coils, each of which is placed in two of said coil grooves spaced apart from each other by a constant distance, which are arranged side by side along the channel at equal intervals and to which alternative currents from a multi-phase power supply are applied according to the phase sequence of said power supply so that magnetic fields generated by said mechanism move toward said nozzle.

3. An apparatus according to claim 2, wherein said partition plate comprises another iron core which has substantially the same width and length as those of said stator iron core.

4. An apparatus according to claim 3, wherein said another iron core is solid.

5. An apparatus according to claim 3, further comprising an upper plate mounted on a rear surface of said another iron core.

6. An apparatus according to claim 2, further comprising a heat-insulating plate interposed between said bottom plate and said stator iron core.

7. An apparatus according to claim 2, further comprising a fan mounted on a side wall of said base for supplying cooling air flowing along said coil grooves of said stator core.

8. An apparatus according to claim 1, wherein said solder tank comprises a wide portion communicating with said nozzle and having the same width as a width of said nozzle, and a narrow portion extending along said channel.

9. An apparatus according to claim 8, wherein said channel is located immediately below said narrow portion and has a width smaller than a width of said narrow portion.

10. The apparatus of claim 2 wherein each of said coils has a first portion positioned in a first groove and a second portion positioned in a second groove separted from said first groove by a third groove, whereby a coil adjacent to each of said coils has a first portion in said third groove, whereby all of said coils overlap one another.

* * * * *